United States Patent
Liu et al.

(10) Patent No.: US 11,799,136 B2
(45) Date of Patent: Oct. 24, 2023

(54) HYBRID SERIES BATTERY MODULE, BATTERY PACK, AND ELECTRICAL APPARATUS

(71) Applicant: CONTEMPORARY AMPEREX TECHNOLOGY CO., LIMITED, Ningde (CN)

(72) Inventors: Qian Liu, Ningde (CN); Quanguo Li, Ningde (CN); Yonghuang Ye, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/327,674

(22) Filed: Jun. 1, 2023

(65) Prior Publication Data

US 2023/0307720 A1    Sep. 28, 2023

Related U.S. Application Data

(63) Continuation of application No. PCT/CN2022/070126, filed on Jan. 4, 2022.

(51) Int. Cl.
*H01M 50/267*  (2021.01)
*H01M 4/02*    (2006.01)
(Continued)

(52) U.S. Cl.
CPC ......... *H01M 10/4207* (2013.01); *H01M 4/80* (2013.01); *H01M 10/0585* (2013.01);
(Continued)

(58) Field of Classification Search
None
See application file for complete search history.

(56) References Cited

U.S. PATENT DOCUMENTS

2014/0342216 A1   11/2014  Kohlberger
2016/0046195 A1*  2/2016   Jang .................. B60L 58/21
                                                      320/103

FOREIGN PATENT DOCUMENTS

CN    102738497 A    10/2012
CN    103311562 A     9/2013
(Continued)

OTHER PUBLICATIONS

The World Intellectual Property Organization (WIPO) International Search Report for PCT/CN2022/070126 dated Sep. 27, 2022 6 pages (including English translation).
(Continued)

*Primary Examiner* — Haixia Zhang
(74) *Attorney, Agent, or Firm* — ANOVA LAW GROUP, PLLC

(57) ABSTRACT

A hybrid series battery module includes a first-type battery cell including a first negative electrode plate and a second-type battery cell including a second negative electrode plate. Energy density of the first-type battery cell is less than energy density of the second-type battery cell. A first interlayer spacing of a negative electrode active material of the first negative electrode plate is greater than a second interlayer spacing of a negative electrode active material of the second negative electrode plate. In a state of charge of 0%, a ratio of the first interlayer spacing to the second interlayer spacing falls within a range of greater than or equal to 1.005 and less than or equal to 1.600.

20 Claims, 4 Drawing Sheets

(51) Int. Cl.
*H01M 10/42* (2006.01)
*H01M 10/0585* (2010.01)
*H01M 4/80* (2006.01)
*H01M 50/471* (2021.01)

(52) U.S. Cl.
CPC ....... *H01M 50/267* (2021.01); *H01M 50/471* (2021.01); *H01M 2004/021* (2013.01); *H01M 2004/027* (2013.01)

(56) References Cited

FOREIGN PATENT DOCUMENTS

| | | |
|---|---|---|
| CN | 208674305 U | 3/2019 |
| CN | 113437441 A | 9/2021 |

OTHER PUBLICATIONS

The World Intellectual Property Organization (WIPO) Written Opinion for PCT/CN2022/070126 dated Sep. 27, 2022 10 pages (including English translation).

* cited by examiner

HYBRID SERIES BATTERY MODULE, BATTERY PACK, AND ELECTRICAL APPARATUS

CROSS-REFERENCE TO RELATED APPLICATION

This application is a continuation of International Application No. PCT/CN2022/070126, filed on Jan. 4, 2022, the entire content of which is incorporated herein by reference.

TECHNICAL FIELD

This application relates to the field of secondary battery technologies, and more specifically, this application relates to a hybrid series battery module, a battery pack, and an electrical apparatus.

BACKGROUND

In the field of secondary batteries, compared with the lithium batteries, other batteries such as sodium-ion batteries and potassium-ion batteries perform poorly in energy density which is key electrochemical performance, and thus have low endurance. Therefore, those skilled in the art commonly believe that the sodium-ion batteries and potassium-ion batteries are not suitable for industrial application. Over decades of development, those skilled in the art typically have focused on studies of lithium-ion batteries and ignored the sodium-ion batteries and potassium-ion batteries.

Lithium-ion batteries have been widely used in energy storage power supply systems such as hydroelectric power plants, thermal power plants, wind power plants, and solar power plants, and many other fields including electric tools, electric bicycles, electric motorcycles, electric vehicles, military equipment, and aerospace. Along with the great development of lithium-ion batteries, higher requirements are imposed on the energy density, cycling performance, safety performance, and the like. However, in recent years, development of lithium-ion battery technologies hit a bottleneck. In addition, rising price of lithium resources increases costs of lithium-ion batteries.

Therefore, improved battery modules are required in the art.

SUMMARY

This application has been made in view of the foregoing issues and is intended to provide an improved battery module and a battery pack and an electrical apparatus that include the improved battery module. Specifically, in this application, a first-type battery cell such as a sodium-ion battery or potassium-ion battery and a second-type battery cell such as a lithium-ion battery are properly arranged in a hybrid manner, so that the first-type battery cell and the second-type battery cell can achieve complementarity in performance, thereby increasing comprehensive performance of the battery module, for example, including but not limited to energy density, low-temperature performance, structural stability, safety, heat dissipation performance, and industrial manufacturability, and decreasing entire costs of the battery module.

However, because the first-type battery cell and the second-type battery cell use different chemical systems, the first-type battery cell and the second-type battery cell often have many problems in compatibility and coordination between them when arranged in a hybrid manner (for example, in series), failing to improve performance of the resulting battery module, even causing degradation, and finally making the battery module failed. Those skilled in the art have been looking forward to resolving the problems but fail. In this application, the problems are creatively resolved by fit design of an interlayer spacing of a negative electrode active material in the battery cell, so as to obtain a battery module having improved performance.

A first aspect of this application provides a hybrid series battery module. The hybrid series battery module includes one or more first-type battery cells, where each of the first-type battery cells includes a first negative electrode plate; and one or more second-type battery cells, where each of the second-type battery cells includes a second negative electrode plate. Energy density of the first-type battery cell is less than energy density of the second-type battery cell. An interlayer spacing d1 of a negative electrode active material of the first negative electrode plate is greater than an interlayer spacing d2 of a negative electrode active material of the second negative electrode plate. In a state of charge of 0%, a ratio d1/d2 of the interlayer spacing d1 to the interlayer spacing d2 falls within a range of greater than or equal to 1.005 and less than or equal to 1.600.

In any embodiment, optionally, in a state of charge of 0%, the ratio d1/d2 of the interlayer spacing d1 to the interlayer spacing d2 falls within a range of greater than or equal to 1.010 and less than or equal to 1.200. Further optionally, in a state of charge of 0%, the ratio d1/d2 of the interlayer spacing d1 to the interlayer spacing d2 falls within a range of greater than or equal to 1.100 and less than or equal to 1.170.

In any embodiment, the energy density of the first-type battery cell matching that of the second-type battery cell makes a ratio V1/V2 of volume V1 of the first-type battery cell to volume V2 of the second-type battery cell fall within a range of greater than 0.20 and less than or equal to 20.00. Optionally, the energy density of the first-type battery cell matching that of the second-type battery cell makes the ratio V1/V2 of the volume V1 of the first-type battery cell to the volume V2 of the second-type battery cell fall within a range of greater than or equal to 0.40 and less than or equal to 5.00. Further optionally, the energy density of the first-type battery cell matching that of the second-type battery cell makes the ratio V1/V2 of the volume V1 of the first-type battery cell to the volume V2 of the second-type battery cell fall within a range of greater than or equal to 1.00 and less than or equal to 2.10.

In any embodiment, the energy density of the first-type battery cell matching that of the second-type battery cell makes a ratio T1/T2 of thickness T1 of the first-type battery cell to thickness T2 of the second-type battery cell fall within a range of greater than 1.00 and less than or equal to 20.00. Optionally, the energy density of the first-type battery cell matching that of the second-type battery cell makes the ratio T1/T2 of the thickness T1 of the first-type battery cell to the thickness T2 of the second-type battery cell fall within a range of greater than or equal to 1.02 and less than or equal to 5.00. Further optionally, the energy density of the first-type battery cell matching that of the second-type battery cell makes the ratio T1/T2 of the thickness T1 of the first-type battery cell to the thickness T2 of the second-type battery cell fall within a range of greater than or equal to 1.05 and less than or equal to 2.10.

In any embodiment, a ratio E1/E2 of volumetric energy density E1 of the first-type battery cell to volumetric energy density E2 of the second-type battery cell falls within a range of greater than or equal to 0.20 and less than or equal to 1.00. Optionally, the ratio E1/E2 of the volumetric energy density E1 of the first-type battery cell to the volumetric energy density E2 of the second-type battery cell falls within a range of greater than or equal to 0.25 and less than or equal to 0.90. Further optionally, the ratio E1/E2 of the volumetric energy density E1 of the first-type battery cell to the volumetric energy density E2 of the second-type battery cell falls within a range of greater than or equal to 0.30 and less than or equal to 0.86.

In any embodiment, a ratio G1/G2 of weight energy density G1 of the first-type battery cell to weight energy density G2 of the second-type battery cell falls within a range of greater than or equal to 0.20 and less than or equal to 1.00. Optionally, the ratio G1/G2 of the weight energy density G1 of the first-type battery cell to the weight energy density G2 of the second-type battery cell falls within a range of greater than or equal to 0.30 and less than or equal to 0.99. Further optionally, the ratio G1/G2 of the weight energy density G1 of the first-type battery cell to the weight energy density G2 of the second-type battery cell falls within a range of greater than or equal to 0.40 and less than or equal to 0.95.

In any embodiment, in a case that no substrate is included, a ratio P1/P2 of porosity P1 of the first negative electrode plate to porosity P2 of the second negative electrode plate (i.e., the ratio P1/P2 of the porosity P1 of the first negative electrode plate to the porosity P2 of the second negative electrode plate not considering substrate material) falls within a range of greater than or equal to 0.75 and less than or equal to 3.00. Optionally, in a case that no substrate is included, the ratio P1/P2 of the porosity P1 of the first negative electrode plate to the porosity P2 of the second negative electrode plate falls within a range of greater than or equal to 0.80 and less than or equal to 2.00. Further optionally, in a case that no substrate is included, the ratio P1/P2 of the porosity P1 of the first negative electrode plate to the porosity P2 of the second negative electrode plate falls within a range of greater than or equal to 0.90 and less than or equal to 1.50.

In any embodiment, a ratio S1/S2 of a median particle size S1 of the negative electrode active material of the first negative electrode plate to a median particle size S2 of the negative electrode active material of the second negative electrode plate falls within a range of greater than or equal to 0.10 and less than or equal to 1.00. Optionally, the ratio S1/S2 of the median particle size S1 of the negative electrode active material of the first negative electrode plate to the median particle size S2 of the negative electrode active material of the second negative electrode plate falls within a range of greater than or equal to 0.15 and less than or equal to 0.95. Further optionally, the ratio S1/S2 of the median particle size S1 of the negative electrode active material of the first negative electrode plate to the median particle size S2 of the negative electrode active material of the second negative electrode plate falls within a range of greater than or equal to 0.30 and less than or equal to 0.90.

In any embodiment, a ratio N/M of a number N of the first-type battery cell to a number M of the second-type battery cell is greater than or equal to 1. Optionally, the ratio N/M of the number N of the first-type battery cell to the number M of the second-type battery cell falls within a range of greater than or equal to 1.5 and less than or equal to 200. Further optionally, the ratio N/M of the number N of the first-type battery cell to the number M of the second-type battery cell falls within a range of greater than or equal to 2 and less than or equal to 100.

In any embodiment, the first-type battery cell and the second-type battery cell are spaced apart.

In any embodiment, the first-type battery cell is arranged on two ends of and in the middle of the hybrid series battery module.

A second aspect of this application provides a battery pack. The battery pack includes the hybrid series battery module in the first aspect of this application.

A third aspect of this application provides an electrical apparatus. The electrical apparatus includes the hybrid series battery module in the first aspect of this application or the battery pack in the second aspect of this application.

BRIEF DESCRIPTION OF DRAWINGS

To understand the present disclosure in detail, a more specific description of the present disclosure briefly summarized above may be obtained with reference to embodiments. Some embodiments are shown in the accompanying drawings. To facilitate understanding, the same reference signs have been used as far as possible to denote identical elements that are common to the figures. However, it should be noted that the drawings illustrate only typical embodiments of the present disclosure and therefore should not be considered as limitations on the scope of the present disclosure because the present disclosure may allow other equivalent embodiments.

DESCRIPTION OF EMBODIMENTS

Figure 1A:
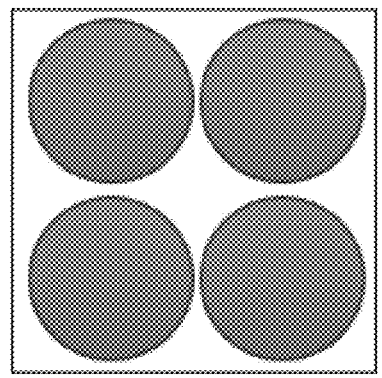
FIG. 1A shows an arrangement manner of an example battery cell having low energy density.

The following specifically discloses embodiments of a positive electrode active material and a manufacturing method thereof, a positive electrode plate, a secondary battery, a battery module, a battery pack, and an electrical apparatus in this application with appropriate reference to detailed descriptions of accompanying drawings. However, there may be cases where unnecessary detailed descriptions are omitted. For example, detailed description of a well-known matter or repeated description of an actual identical structure has been omitted. This is to prevent the following descriptions from becoming unnecessarily cumbersome, facilitating understanding of those skilled in the art. In addition, the accompanying drawings and the following descriptions are provided for those skilled in the art to fully understand this application and are not intended to limit the subject described in the claims.

"Ranges" disclosed in this application are defined in the form of lower and upper limits. A given range is defined by one lower limit and one upper limit selected, where the selected lower and upper limits define boundaries of that special range. Ranges defined in this method may or may not include end values, and any combinations may be used, meaning that any lower limit may be combined with any upper limit to form a range. For example, if ranges of 60-120 and 80-110 are provided for a specific parameter, it is understood that ranges of 60-110 and 80-120 can also be envisioned. In addition, if low limit values of a range are given as 1 and 2, and upper limit values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed sequentially or randomly, and in some embodiments, are performed sequentially. For example, a method including steps (a) and (b) indicates that the method may include steps (a) and (b) performed sequentially, or may include steps (b) and (a) performed sequentially. For example, that the method may further include step (c) indicates that step (c) may be added to the method in any sequence. For example, the method may include steps (a), (b), and (c), or steps (a), (c), and (b), or steps (c), (a), and (b), or the like.

Unless otherwise specified, "include" and "contain" mentioned in this application are inclusive. For example, the terms "include" and "contain" can mean that other unlisted components may also be included or contained.

In the descriptions of this specification, it should be noted that "more than" and "less than" are inclusive of the present number and that "more" in "one or more" means two or more than two, unless otherwise stated.

In the descriptions of this specification, unless otherwise stated, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

In addition, it can be further understood that various embodiments shown in the figures are illustrative, and the figures are not necessarily drawn to scale.

In this application, specific words are used to describe the embodiments of this application. For example, "one embodiment", "an embodiment", and/or "some embodiments" means a feature, structure, or characteristic related to at least one embodiment of this application. Therefore, it should be emphasized and noted that "one embodiment" or "an embodiment" or "an alternative embodiment" mentioned in different positions twice or more times in this specification does not necessarily refer to the same embodiment. In addition, some features, structures, or characteristics in one or more embodiments of this application may be combined appropriately.

In this specification, unless otherwise defined, the technical terms or scientific terms used in the claims and the specification should be the usual meanings understood by persons of ordinary skill in the art to which the present disclosure belongs. The terms "first", "second", and the like used in the specification and claims of this application do not denote any sequence, quantity, or importance, but are merely used to distinguish different components. The similar terms such as "one" or "a/an" do not denote a quantity limitation, but denote the presence of at least one.

In this application, a "cell" is a battery cell that can be charged and discharged independently. This application does not impose special limitations on the shape of the battery cell, and the battery cell may be cylindrical, rectangular, or of any other shapes.

In a hybrid series battery module, because a first-type battery cell (such as a sodium-ion cell and a potassium-ion cell) and a second-type battery cell (such as a lithium-ion cell) use different chemical systems, active ions undergoing reversible intercalation and deintercalation have different radii and different intercalation and deintercalation mechanisms, and the two types of battery cells may mutually restrain, contradict with each other, and thus may have one's performance well played while having the other's performance restrained, thereby decreasing the performance of the battery module formed by hybrid arrangement and even making the battery module failed. Those skilled in the art have been looking forward to converting the case that the two types of battery cells in the hybrid series battery module have one's performance well played while having the other's performance restrained into complementarity in performance, but no methods have been found before this application for overcoming the restraint and contradiction of the two types of battery cells.

The inventors have found that a smaller interlayer spacing of a negative electrode active material in a negative electrode plate of the battery cell allows a smaller radius of active ions to intercalate into an interlayer, thus making intercalation and deintercalation of the active ions more difficult from the interlayer structure and causing poor kinetic performance. An active material having a small interlayer spacing features a high crystallinity (in other words, a long range order degree of a crystal structure) and strong anisotropy, causing an electrode plate to rebound heavily and leading to quick increase in swelling force of a battery cell during repeated charge and discharge. A larger interlayer spacing of the negative electrode active material in the negative electrode plate of the battery cell allows a larger radius of the active ions to intercalate into an interlayer, thus making intercalation and deintercalation of the active ions easier from the interlayer structure and providing good kinetic performance. An active material having a large interlayer spacing features a low crystallinity (in other words, a long range order degree of a crystal structure) and strong isotropy, causing an electrode plate to rebound slightly and leading to slow increase in the swelling force of a battery cell during repeated charge and discharge. In this application, an interlayer spacing $d_1$ of a negative electrode active material of the first-type battery cell is greater than an interlayer spacing $d_2$ of a negative electrode active material of the second-type battery cell.

Therefore, a matching degree between the interlayer spacings of the negative electrode active materials of the first-type battery cell and the second-type battery cell may have a significant impact on performance of a battery module/battery pack assembled. In this application, a ratio d1/d2 of the interlayer spacing d1 of the negative electrode active material of the first-type battery cell and the interlayer spacing d2 of the negative electrode active material of the second-type battery cell is used to denote such matching degree. In this way, the complementarity in performance between the first-type battery cell and the second-type battery cell is achieved using such matching degree, increasing entire performance of the resulting battery module.

In an embodiment, this application provides a hybrid series battery module. The hybrid series battery module includes one or more first-type battery cells and one or more first-type battery cells, where each of the first-type battery cells may include a first negative electrode plate and each of the second-type battery cells may include a second negative electrode plate. Energy density of the first-type battery cell may be less than energy density of the second-type battery cell. An interlayer spacing d1 of a negative electrode active material of the first negative electrode plate may be greater than an interlayer spacing d2 of a negative electrode active material of the second negative electrode plate. In a state of charge (SOC) of 0%, that is, after the active ions capable of intercalating and deintercalating completely deintercalate from a negative electrode, the ratio d1/d2 of the interlayer spacing d1 to the interlayer spacing d2 falls within a range of greater than or equal to 1.005 and less than or equal to 1.600.

If d1/d2 exceeds the above range, the active ions of the first-type battery cell may be unable to intercalate into the negative electrode active material or less active ions of the first-type battery cell and the second-type battery cell intercalate into the negative electrode active material, leading to low capacity and poor rate performance of the battery module. On the contrary, if d1/d2 is within the above range, the resulting battery module has a relatively high capacity and good rate performance. In addition, in the above range, d1 is relatively close to d2. This helps improve the entire kinetic performance of the battery module and reduce increase in the swelling force of the battery cell during repeated charge and discharge. Especially for increase in the swelling force of the battery cell in the battery module, it is very difficult to reduce increase in the swelling force due to different chemical systems of the two types of battery cells.

In optional embodiments, in the state of charge of 0%, the ratio d1/d2 of the interlayer spacing d1 to the interlayer spacing d2 falls within a range of greater than or equal to 1.010 and less than or equal to 1.200. Additionally or alternatively, in the state of charge of 0%, the ratio d1/d2 of the interlayer spacing d1 to the interlayer spacing d2 falls within a range of greater than or equal to 1.100 and less than or equal to 1.170. For example, the ratio d1/d2 may be a value, for example, 1.005, 1.010, 1.015, 1.020, 1.025, 1.030, 1.035, 1.040, 1.045, 1.050, 1.055, 1.060, 1.065, 1.070, 1.075, 1.080, 1.085, 1.090, 1.095, 1.100, 1.105, 1.110, 1.115, 1.120, 1.125, 1.130, 1.135, 1.140, 1.145, 1.150, 1.155, 1.160, 1.165, 1.170, 1.175, 1.180, 1.185, 1.190, 1.195, 1.200, 1.205, 1.210, 1.215, 1.220, 1.225, 1.230, 1.235, 1.240, 1.245, 1.250, 1.255, 1.260, 1.265, 1.270, 1.275, 1.280, 1.285, 1.290, 1.295, 1.300, 1.305, 1.310, 1.315, 1.320, 1.325, 1.330, 1.335, 1.340, 1.345, 1.350, 1.355, 1.360, 1.365, 1.370, 1.375, 1.380, 1.385, 1.390, 1.395, 1.400, 1.405, 1.410, 1.415, 1.420, 1.425, 1.430, 1.435, 1.440, 1.445, 1.450, 1.455, 1.460, 1.465, 1.470, 1.475, 1.480, 1.485, 1.490, 1.495, 1.500, 1.505, 1.510, 1.515, 1.520, 1.525, 1.530, 1.535, 1.540, 1.545, 1.550, 1.555, 1.560, 1.565, 1.570, 1.575, 1.580, 1.585, 1.590, 1.595, or 1.600. It should be noted that, although the above values have been listed in parallel in this application, it does not mean that the inventors acknowledge that the ratio d1/d2 can always attain equivalent or similar performance within a range defined by using any two of the foregoing values as end values.

In this application, a method for testing the interlayer spacing d of the negative electrode active material of the battery cell is as follows: The battery cell is fully discharged to an end-of-discharge voltage and then left standing in accordance with GB/T-31486. After the battery cell is disassembled, the negative electrode plate is taken out. The negative electrode plate is then soaked in a DMC for 24 hours and taken out, followed by washing with DMC and drying for a future test. An X-ray diffractometer, for example, Bruker D8 Discover and a Cu Kα1 (wavelength is 0.154056 nm) are used to test the negative electrode plate to obtain an X-ray diffraction pattern of the electrode plate. The position (25-28°) at 2θ corresponding to peak (002) is read, and an interlayer spacing d corresponding to peak (002) is calculated based on the wavelength λ of the used incident wave and Bragg equation $2d \sin \theta = n\lambda$.

In one embodiment of this application, the first-type battery cell may be a chemical system of a sodium-ion battery, including but not limited to a Prussian blue derivative/hard carbon system, a polyanionic fast ionic conductor sodium vanadium phosphate (or vanadium sodium fluorophosphate or vanadium sodium oxyfluorophosphate)/hard carbon system, and a transition metal oxide/hard carbon system; and the second-type battery cell may be a battery cell with an olivine-structured active material as a primary positive electrode material (for example, $LiFePO_4$ or $LiMn_{0.6}Fe_{0.4}PO_4$), a battery cell with layer-structured nickel cobalt lithium manganate as a primary negative electrode material (for example, $LiNi_{0.60}Co_{0.10}Mn_{0.30}O_2$), or the like.

In this application, the following further optimization design significantly improves the kinetic performance of the battery cell and battery module, effectively reduces local stress inside the battery module, and improves structural stability and safety of the battery module.

Battery Cell Energy Density

Energy density of a battery cell may be volumetric energy density or weight energy density. In this application, energy density of the first-type battery cell is less than energy density of the second-type battery cell. In one example, volumetric energy density E1 of the first-type battery cell may be within a range of, for example, 200-450 Wh/L. In one example, volumetric energy density E2 of the second-type battery cell may be within a range of, for example, 450-750 Wh/L. In one example, weight energy density G1 of the first-type battery cell may be within a range of, for example, 100-220 Wh/Kg. In one example, weight energy density G2 of the second-type battery cell may be within a range of, for example, 220-350 Wh/Kg.

In one or more embodiments of this application, a ratio E1/E2 of the volumetric energy density E1 of the first-type battery cell to the volumetric energy density E2 of the second-type battery cell may fall within a range of greater than or equal to 0.20 and less than or equal to 1.00. In one optional embodiment, the ratio E1/E2 of the volumetric energy density E1 of the first-type battery cell to the volumetric energy density E2 of the second-type battery cell may fall within a range of greater than or equal to 0.25 and less than or equal to 0.90. In still another optional embodiment, the ratio E1/E2 of the volumetric energy density E1 of the first-type battery cell to the volumetric energy density E2 of the second-type battery cell may fall within a range of greater than or equal to 0.30 and less than or equal to 0.86.

For example, the ratio E1/E2 may be a value, for example, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or 1.00. It should be noted that, although the above values have been listed in parallel in this application, it does not mean that the inventors acknowledge that the ratio E1/E2 can always attain equivalent or similar performance within a range defined by using any two of the foregoing values as end values.

In one or more embodiments of this application, a ratio G1/G2 of the weight energy density G1 of the first-type battery cell to the weight energy density G2 of the second-type battery cell may fall within a range of greater than or equal to 0.20 and less than or equal to 1.00. In one optional embodiment, the ratio G1/G2 of the weight energy density G1 of the first-type battery cell to the weight energy density G2 of the second-type battery cell may fall within a range of greater than or equal to 0.30 and less than or equal to 0.99. In still another optional embodiment, the ratio G1/G2 of the weight energy density G1 of the first-type battery cell to the weight energy density G2 of the second-type battery cell may fall within a range of greater than or equal to 0.40 and less than or equal to 0.95.

For example, the ratio G1/G2 may be a value, for example, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or 1.00. It should be noted that, although the above values have been listed in parallel in this application, it does not mean that the inventors acknowledge that the ratio G1/G2 can always attain equivalent or similar performance within a range defined by using any two of the foregoing values as end values.

The energy density of the battery cell may impact the battery cell in height, width, and/or thickness, and design on the height, width, and/or thickness of the battery cell may in turn restrain configuration of the energy density of the battery cell. This will be described in detail hereinafter.

Height, Width, and Thickness of Battery Cell

In one embodiment of this application, because the energy density of the first-type battery cell is less than the energy density of the second-type battery cell, volume of a single battery cell of the first-type battery cell may be larger than volume of a single battery cell of the second-type battery cell so as to obtain the same or similar single battery cell capacity. In some other embodiments, in view of factors such as the existing manufacturing facilities and technologies and for cost consideration, the existing first-type battery cell having a smaller volume is still used. However, if the single battery cell of the first-type battery cell and the single battery cell of the second-type battery cell are excessively different from each other (for example, in the height, width, and/or thickness of the battery cell), adverse impact may be generated on manufacture, assembly, and use of all components of the battery module.

Therefore, in one or more embodiments of this application, a ratio V1/V2 of volume V1 of each first-type battery cell to volume V2 of each second-type battery cell may be controlled within a range of greater than or equal to 0.20 and less than or equal to 20.00. In an optional embodiment, the ratio V1/V2 may fall within a range of greater than or equal to 0.40 and less than or equal to 5.00. In one embodiment, the ratio V1/V2 may fall within a range of greater than or equal to 1.00 and less than or equal to 2.10.

For example, the ratio V1/V2 may be a value, for example, 0.21, 0.25, 0.30, 0.35, 0.40, 0.45, 0.50, 0.55, 0.60, 0.65, 0.70, 0.75, 0.80, 0.85, 0.90, 0.95, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.00, 2.01, 2.02, 2.03, 2.04, 2.05, 2.06, 2.07, 2.08, 2.09, 2.10, 2.20, 2.30, 2.40, 2.50, 2.60, 2.70, 2.80, 2.90, 3.00, 3.10, 3.20, 3.30, 3.40, 3.50, 3.60, 3.70, 3.80, 3.90, 4.00, 4.10, 4.20, 4.30, 4.40, 4.50, 4.60, 4.70, 4.80, 4.90, 5.00, 5.50, 6.00, 6.50, 7.00, 7.50, 8.00, 8.50, 9.00, 9.50, 10.00, 10.50, 11.00, 11.50, 12.00, 12.50, 13.00, 13.50, 14.00, 14.50, 15.00, 15.50, 16.00, 16.50, 17.00, 17.50, 18.00, 18.50, 19.00, 19.50, or 20.00. It should be noted that, although the above values have been listed in parallel in this application, it does not mean that the inventors acknowledge that the ratio V1/V2 can always attain equivalent or similar performance within a range defined by using any two of the foregoing values as end values.

For the height, width, and thickness of the battery cell, in this specification, a dimension in a direction of hybrid series of the two types of battery cells may be defined as thickness T of a battery cell, a dimension perpendicular to the top surface of the hybrid series battery module is defined as height H of a battery cell, and the rest dimension is defined as width W of a battery cell.

In the embodiments of this application, a ratio H1/H2 of height H1 of the first-type battery cell to the height H2 of the second-type battery cell may be in a range of 0.9-1.1. In one embodiment, the ratio H1/H2 may be equal to 1, that is, the first-type battery cell and the second-type battery cell have the same height.

Similarly, a ratio W1/W2 of width W1 of the first-type battery cell to width W2 of the second-type battery cell may be within a range of 0.9-1.1. In one embodiment, the ratio W1/W2 may be equal to 1, that is, the first-type battery cell and the second-type battery cell have the same width.

The first-type battery cell and the second-type battery cell having the same height and width is more conducive to production of all components of the battery module, improvement in production efficiency, and assembly of the battery module/battery pack, thus increasing space utilization to the greatest extent and increasing volumetric energy density of the battery module/battery pack.

Next, the thicknesses of the first-type battery cell and the second-type battery cell are discussed. In the embodiments, the ratio T1/T2 of the thickness T1 of the first-type battery cell to the thickness T2 of the second-type battery cell may fall within a range of greater than 1.00 and less than or equal to 20.00. In an optional embodiment, the ratio T1/T2 of the thickness T1 of the first-type battery cell to the thickness T2 of the second-type battery cell may fall within a range of greater than or equal to 1.02 and less than or equal to 5.00. In still another optional embodiment, the ratio T1/T2 of the thickness T1 of the first-type battery cell to the thickness T2 of the second-type battery cell may fall within a range of greater than or equal to 1.05 and less than or equal to 2.10.

For example, the ratio T1/T2 may be a value, for example, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.00, 2.01, 2.02, 2.03, 2.04, 2.05, 2.06, 2.07, 2.08, 2.09, 2.10, 2.20, 2.30, 2.40, 2.50, 2.60, 2.70, 2.80, 2.90, 3.00, 3.10, 3.20, 3.30, 3.40, 3.50, 3.60, 3.70, 3.80, 3.90, 4.00, 4.10, 4.20, 4.30, 4.40, 4.50, 4.60, 4.70, 4.80, 4.90, 5.00, 5.50, 6.00, 6.50, 7.00, 7.50, 8.00, 8.50, 9.00, 9.50, 10.00, 10.50, 11.00, 11.50, 12.00, 12.50, 13.00, 13.50, 14.00, 14.50, 15.00, 15.50, 16.00, 16.50, 17.00, 17.50, 18.00, 18.50, 19.00, 19.50, or 20.00. It should be noted that, although the above values have been listed in parallel in this application, it does not mean that the inventors acknowledge that the ratio T1/T2 can always attain equivalent or similar performance within a range defined by using any two of the foregoing values as end values.

With one or more of the above ratios being set, the first-type battery cell and the second-type battery cell may have their volumes (including the height, width, and/or thickness of the battery cell) reasonably matched, so that the battery cells in two different chemical systems can be optimized in space utilization, facilitating increasing of the volumetric energy density of the battery cell and battery module/battery pack. In addition, the capacity of the battery cell can also be better matched, so that the battery module/battery pack can be optimized in electric quantity, service life, power, and high- and low-temperature performance.

On the other hand, the energy density of the first-type battery cell and the second-type battery cell being reasonably matched can facilitate reasonable match of their volumes. If the two types of battery cells have excessively large difference in the energy density, in a case that the two types of battery cells have substantially the same height and width, the battery cell having lower energy density is much thicker than the battery cell having higher energy density, so as to obtain a capacity identical or similar to that of the battery cell having the higher energy density. However, if the battery cell is excessively thick, the battery cell may have poor heat dissipation performance and poor manufacturability, lowering product yield, thereby deteriorating processing and electrochemical performance of the battery cell. On the contrary, the energy density of the first-type battery cell and the second-type battery cell being reasonably matched can facilitate reasonable match of their volumes (for example, thickness), so that the battery module/battery pack combined in series have higher volumetric energy density and/or weight energy density while the battery cell is guaranteed to have good heat dissipation performance and be industrially manufacturable.

Porosity of Negative Electrode Plate

In one or more embodiments of this application, in a case that no substrate is included, the ratio P1/P2 of the porosity P1 of the first negative electrode plate of the first-type battery cell to the porosity P2 of the second negative electrode plate of the second-type battery cell may fall within a range of greater than or equal to 0.75 and less than or equal to 3.00. In an optional embodiment, the ratio P1/P2 may fall within a range of greater than or equal to 0.80 and less than or equal to 2.00. In an optional embodiment, the ratio P1/P2 may fall within a range of greater than or equal to 0.90 and less than or equal to 1.50.

For example, the ratio P1/P2 may be a value, for example, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.00, 2.01, 2.02, 2.03, 2.04, 2.05, 2.06, 2.07, 2.08, 2.09, 2.10, 2.11, 2.12, 2.13, 2.14, 2.15, 2.16, 2.17, 2.18, 2.19, 2.20, 2.21, 2.22, 2.23, 2.24, 2.25, 2.26, 2.27, 2.28, 2.29, 2.30, 2.31, 2.32, 2.33, 2.34, 2.35, 2.36, 2.37, 2.38, 2.39, 2.40, 2.41, 2.42, 2.43, 2.44, 2.45, 2.46, 2.47, 2.48, 2.49, 2.50, 2.51, 2.52, 2.53, 2.54, 2.55, 2.56, 2.57, 2.58, 2.59, 2.60, 2.61, 2.62, 2.63, 2.64, 2.65, 2.66, 2.67, 2.68, 2.69, 2.70, 2.71, 2.72, 2.73, 2.74, 2.75, 2.76, 2.77, 2.78, 2.79, 2.80, 2.81, 2.82, 2.83, 2.84, 2.85, 2.86, 2.87, 2.88, 2.89, 2.90, 2.91, 2.92, 2.93, 2.94, 2.95, 2.96, 2.97, 2.98, 2.99, or 3.00. It should be noted that, although the above values have been listed in parallel in this application, it does not mean that the inventors acknowledge that the ratio P1/P2 can always attain equivalent or similar performance within a range defined by using any two of the foregoing values as end values.

With the ratio being excessively large, one type of the battery cell has excessively high porosity while the other type of the battery cell has excessively low porosity, causing an electrode plate having excessively high porosity to have a low compacted density and have a large contact interface with an electrolyte. To fill all the pores, a great amount of electrolyte is needed, and many side reactions take place on the interface, so that the battery cell and battery module have low energy density, high cost, deteriorated cycling performance, high gas production, and greatly increased swelling force. A battery cell having excessively low porosity may cause the electrolyte to have poor infiltration on the electrode plate, deteriorating kinetic performance of the battery cell, thereby impacting the capacity, rate, and service life of the battery cell. Therefore, it is favorable to set the porosity of the negative electrode plates of the first-type battery cell and the second-type battery cell within the above range.

Median Particle Size of Negative Electrode Active Material

In one or more embodiments of this application, the ratio S1/S2 of the median particle size S1 of the negative electrode active material of the first negative electrode plate of the first-type battery cell to the median particle size S2 of the negative electrode active material of the second negative electrode plate of the second-type battery cell may fall within a range of greater than or equal to 0.10 and less than 1.00. In one optional embodiment, the ratio S1/S2 of the median particle size S1 of the negative electrode active material of the first negative electrode plate to the median particle size S2 of the negative electrode active material of the second negative electrode plate may fall within a range of greater than or equal to 0.15 and less than or equal to 0.95.

In still another optional embodiment, the ratio S1/S2 of the median particle size S1 of the negative electrode active material of the first negative electrode plate to the median particle size S2 of the negative electrode active material of the second negative electrode plate may fall within a range of greater than or equal to 0.30 and less than or equal to 0.90.

For example, the ratio S1/S2 may be a value, for example, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, or 0.99. It should be noted that, although the above values have been listed in parallel in this application, it does not mean that the inventors acknowledge that the ratio S1/S2 can always attain equivalent or similar performance within a range defined by using any two of the foregoing values as end values.

The ratio S1/S2 falling within the range is favorable, because this can make the median particle size of the negative active material of the second-type battery cell greater than the median particle size of the negative active material of the first-type battery cell. This facilitates increasing of specific capacity of materials, improves processing performance of slurries, and increases compacted density of the electrode plates, significantly increasing energy density of the second-type battery cell, thereby increasing the energy density of the hybrid series battery module. In addition, this can also guarantee relatively close median particle sizes of the negative electrode active materials of the first-type battery cell and the second-type battery cell, facilitating retaining of a space structure of the electrode plate and inhibiting rebound of the electrode plate, thereby retaining stable porosity during use and facilitating improvement of cycle life and cycling swelling force of the battery cell.

Number of Battery Cells

In one or more embodiments of this application, the ratio N/M of the number N of the first-type battery cell to the number M of the second-type battery cell may be greater than or equal to 1. In an optional embodiment, the ratio N/M of the number N of the first-type battery cell to the number M of the second-type battery cell may fall within a range of greater than or equal to 1.5 and less than or equal to 200. In still another optional embodiment, the ratio N/M of the number N of the first-type battery cell to the number M of the second-type battery cell may fall within a range of greater than or equal to 2 and less than or equal to 100.

For example, the ratio N/M may be a value, for example, 1.0, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200. It should be noted that, although the above values have been listed in parallel in this application, it does not mean that the inventors acknowledge that the ratio N/M can always attain equivalent or similar performance within a range defined by using any two of the foregoing values as end values.

A matching process of the first-type battery cell and the second-type battery cell may be designed mainly from aspects of difference in the energy density, difference in increase of the swelling force, difference in the kinetic performance, difference in temperature rise, difference in the costs, and difference in the safety performance. With the ratio N/M being within the above range, the battery module has excellent entire performance.

Arrangement Manner of Battery Cells

In one or more embodiments of this application, the first-type battery cell and the second-type battery cell may be spaced apart. In addition, in one embodiment, the first-type battery cell may be arranged at the periphery of, at two ends of, and/or in the middle of the battery cell/battery pack.

The arrangement manner of the battery cell in this application can effectively decrease local stress inside the battery module, increasing structural stability and safety of the battery module.

FIG. 1A shows an arrangement manner of an example battery cell having low energy density. In the example shown in FIG. 1A, four first-type battery cells having low energy density are arranged in a form of a quadrangle.

Figure 1B:
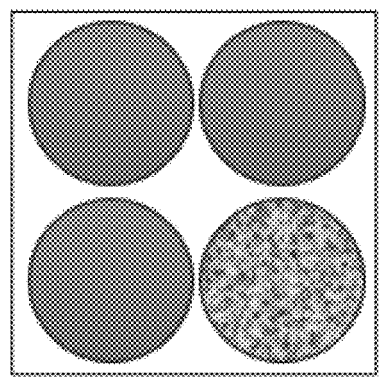
FIG. 1B shows an arrangement manner of an example battery cell having high energy density.

FIG. 1B shows an arrangement manner of an example battery cell having high energy density. In the example shown in FIG. 1B, a second-type battery cell having high energy density is introduced, and, similar to the example shown in FIG. 1A, three first-type battery cells having low energy density and one second-type battery cell having high energy density are hybridly arranged in a form of a quadrangle. Due to introduction of the second-type battery cell having high energy density, compared with the example shown in FIG. 1A, the example in FIG. 1B increases entire energy density of the resulting battery module.

Figure 1C:
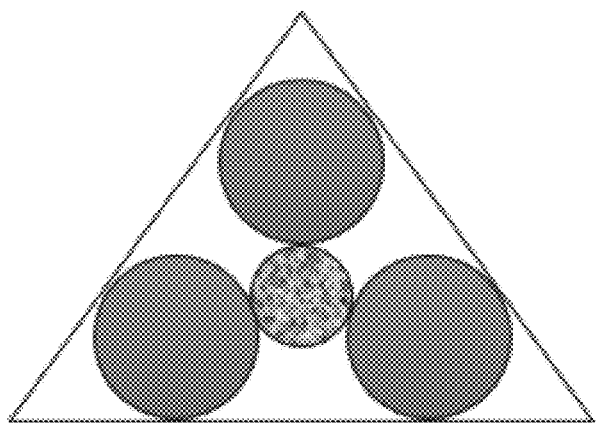
FIG. 1C shows an arrangement manner of an example battery cell having high energy density, low stress, and high heat preservation.

FIG. 1C shows an arrangement manner of an example battery cell having high energy density, low stress, and high heat preservation. In the example shown in FIG. 1C, three first-type battery cells having low energy density and one second-type battery cell having high energy density are hybridly arranged in a form of a triangle, where the second-type battery cell is surrounded by the three first-type battery cells, so that the resulting battery module has high energy density, decreased local stress, and good high- and low-temperature performance.

Figure 2A:
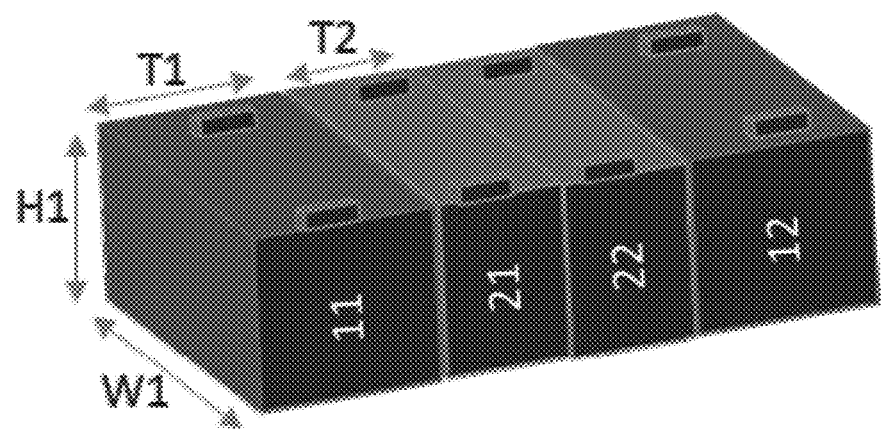
FIG. 2A and FIG. 2B show an arrangement manner of a hybrid series battery module according to an embodiment of this application.
Figure 2B:
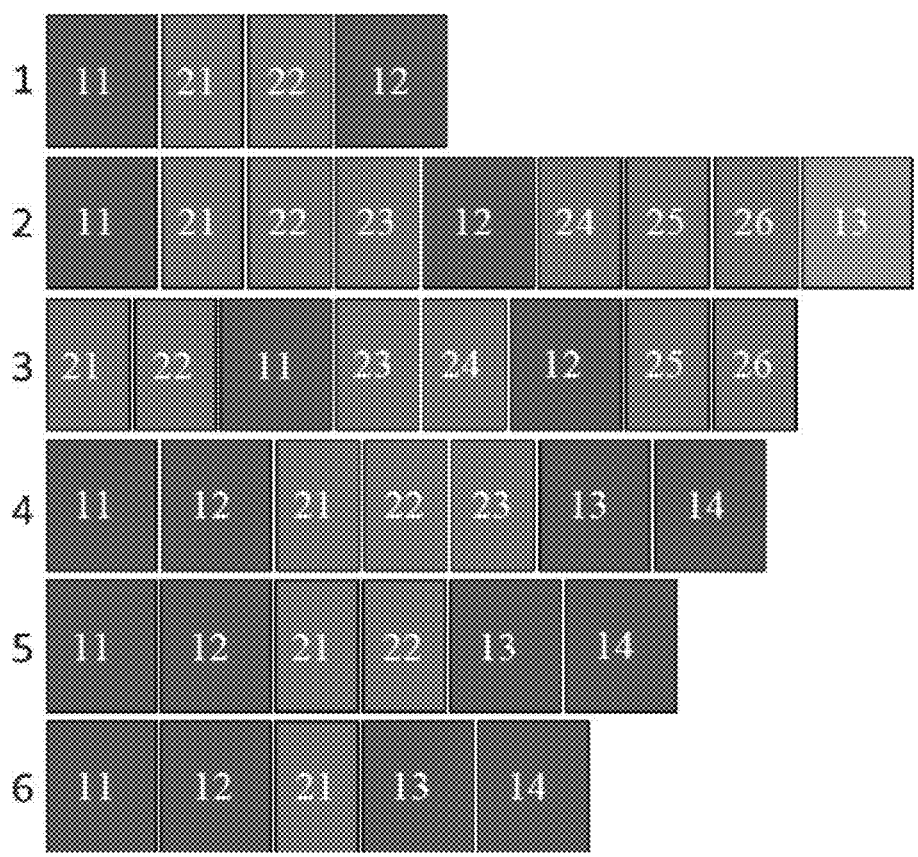

FIG. 2A and FIG. 2B show an arrangement manner of a hybrid series battery module according to the embodiments of this application, where the first figure in the battery cell numbers (for example, "11" in FIG. 2A) represents a first-type battery cell or a second-type battery cell, and the second figure represents a sequence number for distinguishing. FIG. 2A shows a group of the battery modules, and FIG. 2B shows six groups of the battery modules.

As shown in FIG. 2B, the first-type battery cell and the second-type battery cell in a hybrid series battery module may be spaced apart by one or more first-type battery cells, for example, by 2, 3, 4, or n first-type battery cells. As shown in figures, the battery cells at ends of the battery module may be one or more first-type battery cells, or one or more second-type battery cells, or one first-type battery cell and one second-type battery cell. The second-type battery cells may be placed at the ends of the battery module or at other positions, or may be placed at both the ends and other places besides the ends.

Examples and Comparative Examples

The following describes examples of this application. The examples described below are illustrative and only used to explain this application, and cannot be construed as limitations on this application. Examples whose technical solutions or conditions are not specified are made in accordance with technical solutions or conditions described in literature in the field, or made in accordance with product instructions.

The reagents or instruments used are all conventional products that are commercially available if no manufacturer is indicated.

Table 1 and Table 2 show 9 examples in this application, and show 3 comparative examples as contrasts. Table 1 can show how the ratio d1/d2 of the interlayer spacing d1 of the negative electrode active material of the first negative electrode plate of the first-type battery cell to the interlayer spacing d2 of the negative electrode active material of the second negative electrode plate of the second-type battery cell impacts the swelling force of the battery module produced during repeated charge and discharge. Those skilled in the art can understand that due to the difference in the chemical systems of the two types of battery cells, it is very difficult to improve the increase in the swelling force of the battery module. Table 2 can show how the ratio S1/S2 of the median particle size S1 of the negative electrode active material of the first negative electrode plate of the first-type battery cell to the median particle size S2 of the negative electrode active material of the second negative electrode plate of the second-type battery cell impacts capacity retention rate of the battery module. The capacity retention rate is related to the cycle life of the battery cell. On the same condition, a higher capacity retention rate leads to longer cycle life of the battery cell in the battery module.

[Electrolyte]

The electrolyte conducts ions between the positive electrode plate and the negative electrode plate. The electrolyte is not specifically limited to any particular type in this application, and may be selected based on needs. For example, the electrolyte may be in a liquid state, a gel state, or an all-solid state.

In some embodiments, the electrolyte is a liquid electrolyte. The liquid electrolyte includes an electrolytic salt and a solvent.

In some embodiments, the electrolytic salt may be at least one selected from lithium hexafluorophosphate, lithium tetrafluoroborate, lithium perchlorate, lithium hexafluoroborate, lithium bis(fluorosulfonyl)imide, lithium lithium bistrifluoromethanesulfonimide, lithium trifluoromethanesulfonate, lithium difluorophosphate, lithium difluorooxalatoborate, lithium bisoxalatoborate, lithium difluorobisoxalate phosphate, and lithium tetrafluoro oxalate phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propi-

TABLE 1

| | First-type battery cell | Second-type battery cell | d1 (nm) | d2 (nm) | d1/d2 | N/M | Increase rate of swelling force after 1000 cls at room temperature |
|---|---|---|---|---|---|---|---|
| Example 1 | $Na_3V_2(PO_4)_2O_2F$ | $LiFePO_4$ | 0.3415 | 0.3399 | 1.005 | 1 | 199% |
| Example 2 | $Na_3V_2(PO_4)_2O_2F$ | $LiFePO_4$ | 0.5297 | 0.3310 | 1.600 | 2 | 170% |
| Example 3 | $Na_3V_2(PO_4)_2O_2F$ | $LiFePO_4$ | 0.3420 | 0.3385 | 1.010 | 3 | 195% |
| Example 4 | $Na_3V_2(PO_4)_2O_2F$ | $LiFePO_4$ | 0.4009 | 0.3340 | 1.200 | 2 | 99% |
| Example 5 | $Na_3V_2(PO_4)_3$ | $LiFePO_4$ | 0.3700 | 0.3363 | 1.100 | 2 | 105% |
| Example 6 | $Na_{0.93}Cu_{0.22}Fe_{0.3}Mn_{0.48}O_2$ | $LiFePO_4$ | 0.3915 | 0.3345 | 1.170 | 2 | 130% |
| Example 7 | $Na_2MnFe(CN)_6$ | $LiFePO_4$ | 0.3760 | 0.3359 | 1.119 | 2 | 88% |
| Example 8 | $Na_{0.93}Cu_{0.22}Fe_{0.3}Mn_{0.48}O_2$ | $LiNi_{0.65}Co_{0.07}Mn_{0.28}O_2$ | 0.3860 | 0.3361 | 1.148 | 100 | 150% |
| Example 9 | $Na_{0.93}Cu_{0.22}Fe_{0.3}Mn_{0.48}O_2$ | $LiMn_2O_4$ | 0.4400 | 0.3359 | 1.310 | 2 | 97% |
| Comparative Example 1 | $Na_{0.93}Cu_{0.22}Fe_{0.3}Mn_{0.48}O_2$ | $LiFePO_4$ | 0.3770 | 0.3850 | 0.979 | 2 | 230% |
| Comparative Example 2 | $Na_2MnFe(CN)_6$ | $LiNi_{0.50}Co_{0.20}Mn_{0.30}O_2$ | 0.5380 | 0.3360 | 1.601 | 2 | 250% |
| Comparative Example 3 | $LiFePO_4$ | $LiNi_{0.50}Co_{0.20}Mn_{0.30}O_2$ | 0.3360 | 0.3359 | 1.000 | 2 | 360% | acetate, methyl propionate, ethyl propionate, propyl propi-

TABLE 2

| | First-type battery cell | Second-type battery cell | S1 (um) | S2 (um) | S1/S2 | N/M | Capacity retention rate under 2C at room temperature |
|---|---|---|---|---|---|---|---|
| Example 1 | $Na_3V_2(PO_4)_2O_2F$ | $LiFePO_4$ | 3.50 | 35.10 | 0.10 | 1 | 90% |
| Example 2 | $Na_3V_2(PO_4)_2O_2F$ | $LiFePO_4$ | 6.94 | 7.01 | 0.99 | 2 | 90% |
| Example 3 | $Na_3V_2(PO_4)_2O_2F$ | $LiFePO_4$ | 4.09 | 28.01 | 0.15 | 3 | 91% |
| Example 4 | $Na_3V_2(PO_4)_2O_2F$ | $LiFePO_4$ | 6.10 | 6.40 | 0.95 | 2 | 93% |
| Example 5 | $Na_3V_2(PO_4)_3$ | $LiFePO_4$ | 4.50 | 19.60 | 0.23 | 2 | 92% |
| Example 6 | $Na_{0.93}Cu_{0.22}Fe_{0.3}Mn_{0.48}O_2$ | $LiFePO_4$ | 5.94 | 20.10 | 0.30 | 2 | 90% |
| Example 7 | $Na_2MnFe(CN)_6$ | $LiFePO_4$ | 5.02 | 12.90 | 0.39 | 2 | 93% |
| Example 8 | $Na_{0.93}Cu_{0.22}Fe_{0.3}Mn_{0.48}O_2$ | $LiNi_{0.65}Co_{0.07}Mn_{0.28}O_2$ | 9.30 | 10.30 | 0.90 | 100 | 94% |
| Example 9 | $Na_{0.93}Cu_{0.22}Fe_{0.3}Mn_{0.48}O_2$ | $LiMn_2O_4$ | 4.20 | 13.30 | 0.32 | 2 | 92% |
| Comparative Example 1 | $Na_{0.93}Cu_{0.22}Fe_{0.3}Mn_{0.48}O_2$ | $LiFePO_4$ | 9.90 | 7.00 | 1.41 | 2 | 36% |
| Comparative Example 2 | $Na_2MnFe(CN)_6$ | $LiNi_{0.50}Co_{0.20}Mn_{0.30}O_2$ | 1.80 | 41.40 | 0.04 | 2 | 54% |
| Comparative Example 3 | $LiFePO_4$ | $LiNi_{0.50}Co_{0.20}Mn_{0.30}O_2$ | 5.20 | 21.20 | 0.25 | 2 | 85% |

Preparation of Battery Cell onate, methyl butyrate, ethyl butyrate, 1,4-butyrolactone, sulfolane, methyl sulfonyl methane, ethyl methanesulfonate, and diethyl sulfone.

In some embodiments, the liquid electrolyte further optionally includes an additive. For example, the additive may include a negative electrode film-forming additive, a positive electrode film-forming additive, or may include an additive that can improve some performance of a battery cell, for example, an additive for improving over-charge performance of a battery cell, an additive for improving high-temperature performance or low-temperature performance of a battery cell, and the like.

[Separator]

In some embodiments, the battery cell further includes a separator. The separator is not limited to any specific type in this application, and may be any commonly known porous separator with good chemical stability and mechanical stability.

In some embodiments, a material of the separator may be at least one selected from glass fiber, non-woven fabric, polyethylene, polypropylene, and polyvinylidene fluoride. The separator may be a single-layer film or a multi-layer composite film, and is not particularly limited. When the separator is a multi-layer composite film, all layers may be made of same or different materials, which is not particularly limited.

In some embodiments, the positive electrode plate, the negative electrode plate, and the separator may be made into an electrode assembly through winding or lamination.

An example for preparing battery cell is provided as follows.

(1) Preparation of Positive Electrode Slurry

All positive electrode active materials, dot-shaped and flake conductive carbon, and a binder polyvinylidene fluoride (PVDF) that are shown in Table 1 were well stirred and mixed in an N-methylpyrrolidone (NMP for short) solvent at a weight ratio of 96.2:2.7:1.1 to form a uniform and stable slurry having a viscosity of 3000 mPa·s-25000 mPa·s, and the slurry were left standing for 24-48 hours. During this period, no gelation, delamination, or sedimentation occurred.

(2) Preparation of Positive Electrode Plate

The resulting positive electrode material slurry was uniformly applied onto a positive current collector Al foil at a coating weight of 18 mg/cm$^2$. After the positive electrode material slurry was dried, the electrode plate was coldly pressed to the designed compacted density, followed by slitting for future use, to obtain a positive electrode plate.

(3) Preparation of Electrolyte

Ethylene carbonate in equivalent volume was dissolved in propylene carbonate, and then a proper amount of lithium hexafluorophosphate was dissolved to uniformity in the mixed solvent at 1 mol/L for future use to obtain an electrolyte.

(4) Preparation of Negative Electrode Plate

A negative electrode active material such as graphite, conducive carbon, a binder polystyrene butadiene copolymer (SBR), and a thickener sodium carboxymethyl cellulose (CMC) were fully stirred and mixed in a water solvent at a weight ratio of 96.6:0.8:1.8:0.8 to form a uniform and stable negative electrode slurry. The slurry was applied onto a negative electrode current collector Cu foil at a coating weight of 11 mg/cm$^2$. After the slurry was dried, the electrode plate was coldly pressed to the designed compacted density, followed by slitting for future use.

(5) Separator

Polyethylene (PE) or polypropylene (PP) was selected as a separator, and the surface of the separator might be provided with an inorganic and/or organic coating based on needs.

(6) Preparation of Battery Cell

The positive electrode plate, the separator, and the negative electrode plate were wound into a bare battery cell with a conventional manufacturing process of battery cells, then the bare battery cell was put in a battery housing, and the electrolyte was injected, followed by processes such as formation and packaging to finally obtain a chargeable traction battery cell.

In some embodiments, the battery cell may include an outer package for packaging the electrode assembly and the electrolyte. In some embodiments, the outer package of the battery cell may be a soft pack, for example, a soft pouch. A material of the soft pack may be plastic, for example, one or more of polypropylene PP, polybutylene terephthalate PBT, polybutylene succinate PBS, or the like. The outer package of the battery cell may be a hard shell, for example, a hard plastic shell, an aluminum shell, a steel shell, or the like.

In some embodiments, the outer package may include a housing and a cover plate. The housing may include a base plate and a side plate connected onto the base plate, and the base plate and the side plate enclose an accommodating cavity. The housing has an opening communicating with the accommodating cavity, and the cover plate can cover the opening to close the accommodating cavity.

The positive electrode plate, the negative electrode plate, and the separator may be laminated or wound to form an electrode assembly of a laminated or wound structure. The electrode assembly is packaged in the accommodating cavity. The electrolyte may be an electrolyte solution, and the electrode solution infiltrates into the electrode assembly.

Preparation of Battery Pack

Figure 3A:
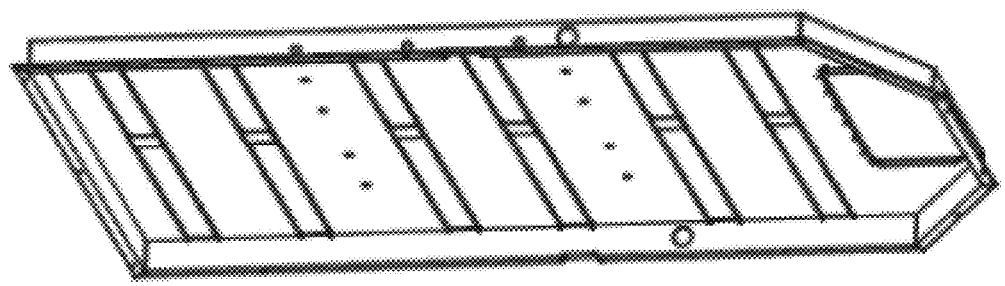
FIG. 3A is a three-dimensional diagram of a lower box body of an example battery box for a battery pack according to an embodiment of this application.
Figure 3B:
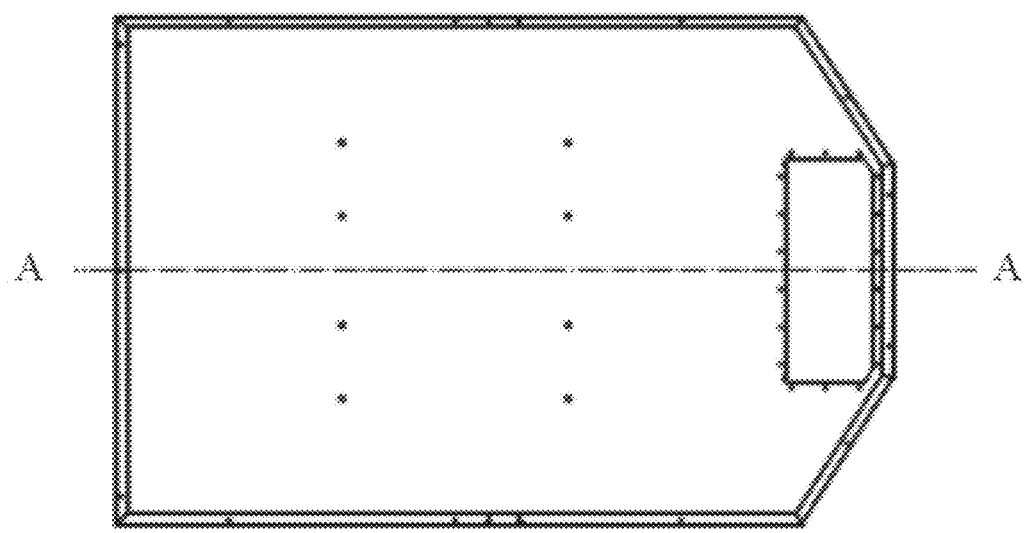
FIG. 3B is a top view of an upper box body of the example box body in FIG. 3A.
Figure 3C:
FIG. 3C is an example cross-sectional view taken along line A-A in FIG. 3B.
Figure 4A:
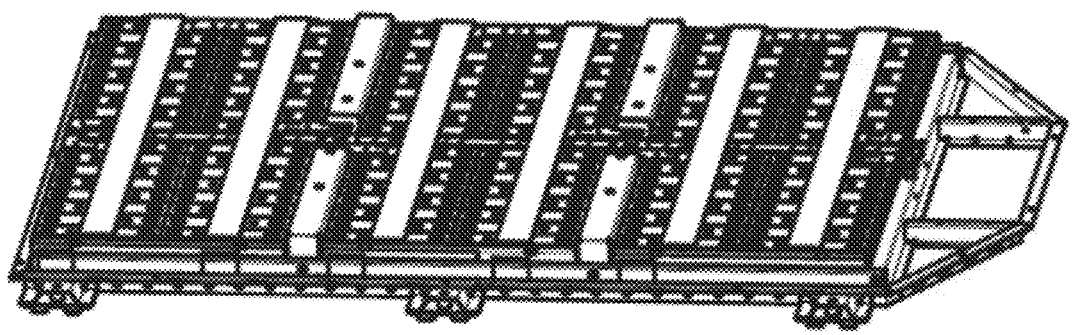
FIG. 4A is a three-dimensional diagram of an example battery pack according to an embodiment of this application.
Figure 4B:
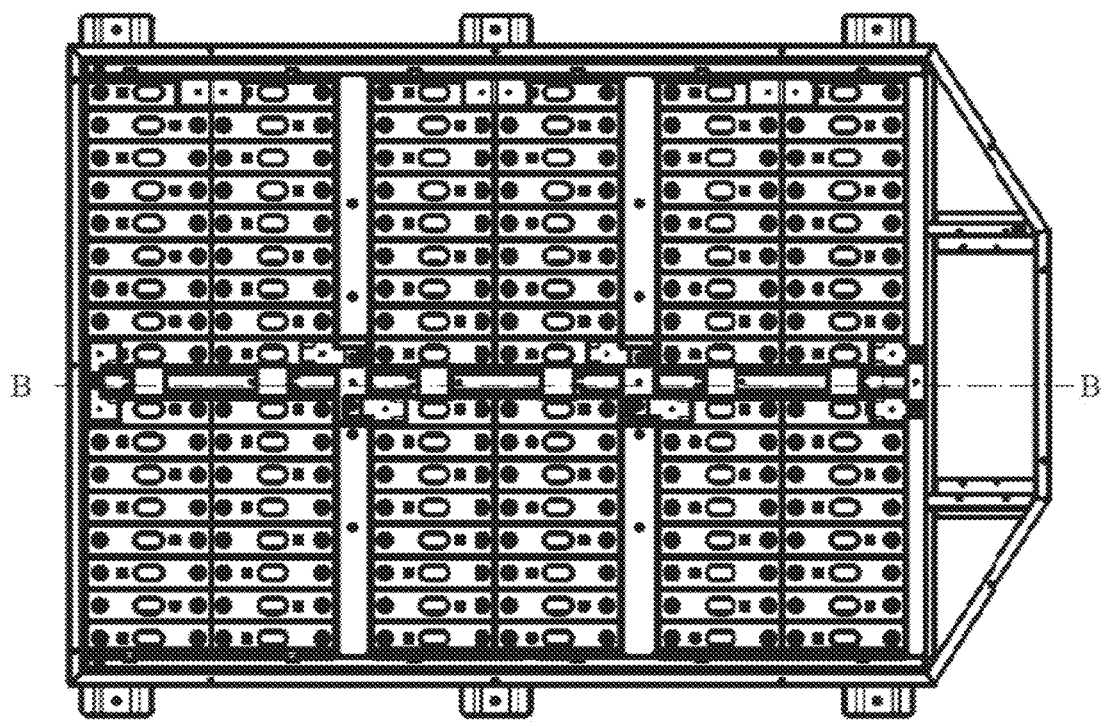
FIG. 4B is a top view of the example battery pack in FIG. 4A.
Figure 4C:
FIG. 4C is an example cross-sectional view taken along line B-B in FIG. 4B.

In an embodiment of this application, after one or more first-type battery cells and one or more second-type battery cells are assembled into the battery module, one or more battery modules can be assembled into a battery pack. The number of battery modules included in a battery pack depends on the application of the battery pack and a parameter of a single battery module. The battery pack may include a battery box (as shown in FIG. 3A to FIG. 3C) and a plurality of battery modules provided inside the battery box. The battery box includes an upper box body and a lower box body, where the upper box body may cover the lower box body and fit with the lower box body to form an enclosed space for accommodating the battery modules. Two or more battery modules may be arranged in the battery box in required manners. In this application, "battery pack" is formed by assembling various control and protection systems such as a battery management system and a thermal management system with one or more battery modules (or a combination directly formed by a plurality of battery cells) (as shown in FIG. 4A to FIG. 4C).

It should be noted that, to simplify description of this application and help understand one or more embodiments, in the foregoing description of the embodiments of this application, various features may sometimes be merged into one embodiment, the drawings, or the description thereof. However, this disclosed method does not mean that the features required by the subject of this application are more than those mentioned in the claims. Actually, features of the embodiments may be less than all of the features of a single embodiment disclosed above.

It should be noted that this application is not limited to the foregoing embodiments. The foregoing embodiments are merely examples, and embodiments having substantially the same constructions and having the same effects as the technical idea within the scope of the technical solutions of this application are all included in the technical scope of this application. In addition, without departing from the essence of this application, various modifications made to the embodiments that can be conceived by those skilled in the art, and other manners constructed by combining some of the constituent elements in the embodiments are also included in the scope of this application.

What is claimed is:

1. A hybrid series battery module, comprising:
a first-type battery cell, wherein the first-type battery cell comprises a first negative electrode plate; and
a second-type battery cell, wherein the second-type battery cell comprises a second negative electrode plate;
wherein:
energy density of the first-type battery cell is less than energy density of the second-type battery cell;
a first interlayer spacing of a negative electrode active material of the first negative electrode plate is greater than a second interlayer spacing of a negative electrode active material of the second negative electrode plate; and
in a state of charge of 0%, a ratio of the first interlayer spacing to the second interlayer spacing falls within a range of greater than or equal to 1.005 and less than or equal to 1.600.

2. The hybrid series battery module according to claim 1, wherein in the state of charge of 0%, the ratio of the first interlayer spacing to the second interlayer spacing falls within a range of greater than or equal to 1.010 and less than or equal to 1.200.

3. The hybrid series battery module according to claim 1, wherein in the state of charge of 0%, the ratio of the first interlayer spacing to the second interlayer spacing falls within a range of greater than or equal to 1.100 and less than or equal to 1.170.

4. The hybrid series battery module according to claim 1, wherein the energy density of the first-type battery cell matches the energy density of the second-type battery cell, so that a ratio of volume of the first-type battery cell to volume of the second-type battery cell falls within a range of greater than 0.20 and less than or equal to 20.00.

5. The hybrid series battery module according to claim 4, wherein the ratio of the volume of the first-type battery cell to the volume of the second-type battery cell falls within a range of greater than or equal to 0.40 and less than or equal to 5.00.

6. The hybrid series battery module according to claim 1, wherein the energy density of the first-type battery cell matches the energy density of the second-type battery cell, so that a ratio of thickness of the first-type battery cell to thickness of the second-type battery cell falls within a range of greater than 1.00 and less than or equal to 20.00.

7. The hybrid series battery module according to claim 6, the ratio of the thickness of the first-type battery cell to the thickness of the second-type battery cell falls within a range of greater than or equal to 1.02 and less than or equal to 5.00.

8. The hybrid series battery module according to claim 1, wherein a ratio of a volumetric energy density of the first-type battery cell to a volumetric energy density of the second-type battery cell falls within a range of greater than or equal to 0.20 and less than or equal to 1.00.

9. The hybrid series battery module according to claim 8, wherein the ratio of the volumetric energy density of the first-type battery cell to the volumetric energy density of the second-type battery cell falls within a range of greater than or equal to 0.25 and less than or equal to 0.90.

10. The hybrid series battery module according to claim 1, wherein a ratio of weight energy density of the first-type battery cell to weight energy density of the second-type battery cell falls within a range of greater than or equal to 0.20 and less than or equal to 1.00.

11. The hybrid series battery module according to claim 10, wherein the ratio of the weight energy density of the first-type battery cell to the weight energy density of the second-type battery cell falls within a range of greater than or equal to 0.30 and less than or equal to 0.99.

12. The hybrid series battery module according to claim 1, wherein a ratio of porosity of the first negative electrode plate to porosity of the second negative electrode plate not considering substrate material falls within a range of greater than or equal to 0.75 and less than or equal to 3.00.

13. The hybrid series battery module according to claim 12, the ratio of the porosity of the first negative electrode plate to the porosity of the second negative electrode plate not considering substrate material falls within a range of greater than or equal to 0.80 and less than or equal to 2.00.

14. The hybrid series battery module according to claim 1, wherein a ratio of a median particle size of the negative electrode active material of the first negative electrode plate to a median particle size of the negative electrode active material of the second negative electrode plate falls within a range of greater than or equal to 0.10 and less than 1.00.

15. The hybrid series battery module according to claim 14, wherein the ratio of the median particle size of the negative electrode active material of the first negative electrode plate to the median particle size of the negative electrode active material of the second negative electrode plate falls within a range of greater than or equal to 0.15 and less than or equal to 0.95.

16. The hybrid series battery module according to claim 1, wherein:
the first-type battery cell is one of one or more first-type battery cells of the hybrid series battery module, and the second-type battery cell is one of one or more second-type battery cells of the hybrid series battery module; and
a ratio of a number of the one or more first-type battery cells to a number of the one or more second-type battery cells is greater than or equal to 1.

17. The hybrid series battery module according to claim 1, wherein the first-type battery cell and the second-type battery cell are spaced apart from each other.

18. The hybrid series battery module according to claim 1, wherein the first-type battery cell is one of a plurality of first-type battery cells each arranged at one of two ends of the hybrid-series battery module or in a middle of the hybrid-series battery module.

19. A battery pack, comprising:
a hybrid series battery module, comprising:
a first-type battery cell, wherein the first-type battery cell comprises a first negative electrode plate; and
a second-type battery cell, wherein the second-type battery cell comprises a second negative electrode plate;
wherein:
energy density of the first-type battery cell is less than energy density of the second-type battery cell;

a first interlayer spacing of a negative electrode active material of the first negative electrode plate is greater than a second interlayer spacing of a negative electrode active material of the second negative electrode plate; and in a state of charge of 0%, a ratio of the first interlayer spacing to the second interlayer spacing falls within a range of greater than or equal to 1.005 and less than or equal to 1.600.

20. An electrical apparatus, comprising:

a hybrid series battery module configured to provide power, the hybrid series battery module comprising:

a first-type battery cell, wherein the first-type battery cell comprises a first negative electrode plate; and a second-type battery cell, wherein the second-type battery cell comprises a second negative electrode plate;

wherein:

energy density of the first-type battery cell is less than energy density of the second-type battery cell;

a first interlayer spacing of a negative electrode active material of the first negative electrode plate is greater than a second interlayer spacing of a negative electrode active material of the second negative electrode plate; and in a state of charge of 0%, a ratio of the first interlayer spacing to the second interlayer spacing falls within a range of greater than or equal to 1.005 and less than or equal to 1.600.

\* \* \* \* \*